United States Patent [19]

Sabloewski et al.

[11] Patent Number: 4,470,317

[45] Date of Patent: Sep. 11, 1984

[54] PIPETTING DEVICE

[75] Inventors: Horst Sabloewski, Hamburg; Rolf Zickermann, Quickborn, both of Fed. Rep. of Germany

[73] Assignee: Eppendorf Geratebau Netheler & Hinz GmbH, Hamburg, Fed. Rep. of Germany

[21] Appl. No.: 461,483

[22] Filed: Jan. 27, 1983

[30] Foreign Application Priority Data

Feb. 6, 1982 [DE] Fed. Rep. of Germany ....... 3204178

[51] Int. Cl.[3] .............................................. G01N 1/14

[52] U.S. Cl. .............................. 73/864.16; 73/864.18; 604/135; 604/211

[58] Field of Search ........... 73/864.16, 864.18, 864.13; 604/135, 208, 209, 210, 211, 224, 228

[56] References Cited

U.S. PATENT DOCUMENTS 3,831,602 8/1974 Broadwin ............................ 604/210
4,086,062 4/1978 Hach ............................ 73/864.16 X
4,144,761 3/1979 Dzaack ............................ 73/864.18
4,231,368 11/1980 Becker ............................ 604/224 X
4,335,621 6/1982 Tervamäki et al. ......... 73/864.16 X
4,406,170 9/1983 Kühn ................................ 73/864.16

FOREIGN PATENT DOCUMENTS 1439659 6/1976 United Kingdom ............. 73/864.18

*Primary Examiner*—Gerald Goldberg
*Assistant Examiner*—Tom Noland
*Attorney, Agent, or Firm*—Toren, McGeady and Stanger

[57] ABSTRACT

A pipetting device serves to hold and actuate a detachably mounted syringe having a syringe body and a piston. The device is provided with means for adjusting the volumetric capacity of the syringe. The device comprises two racks and a pinion which is in mesh with both said racks and operable to move them in mutually opposite directions. The racks are connected to respective sliders, one of which is connected to a rod for actuating the piston of the syringe. A single actuating lever is provided for actuating the piston and is connected to the sliders by an actuating mechanism, which comprises a positively actuated transverse slider, which constitutes a stop member and in response to an automatic resetting of the actuating lever to its initial position is moved from the path of one of said sliders into the path of the other.

17 Claims, 10 Drawing Figures

PIPETTING DEVICE

FIELD OF THE INVENTION

This invention relates to a pipetting device for holding and operating a detachably inserted syringe, which comprises a syringe body and a piston. The device is adapted to infinitely adjust the volumetric capacity of the syringe and comprises two sliders, which are movable relative to each other in mutually opposite directions and provided with respective racks, a pinion meshing with both said racks so that the sliders are operatively connected, and an actuating rod connecting one of said sliders to the piston. Means are provided for an infinite ajustment of the volumetric capacity of the syringe, i.e., the capacity can be set anywhere between zero and a maximum amount with the precision limited only by the usual limitations from reading a scale.

The pipetting device may also consist of a mechanical actuator combined with syringe, particularly a syringe body and a piston which is movable in the syringe body and the displacement of which is adjustable to fractional parts of the volumetric capacity of the syringe body.

DESCRIPTION OF THE PRIOR ART

Such pipetting device comprising two sliders operatively connected by a pinion is known from U.S. Pat. No. 4,144,761. Whereas that design is desirable, it has been believed that wo actuating levers consisting of pressure rods are required for an actuation of the sliders in alternation. Special features, such as frictional joints or a counterweight, are required to hold the sliders in their adjusted position. If a counterweight is provided, the pipetting device can be used only in a special orientation.

The use of two hand levers involves the disadvantage that the position of the hand on the device must be changed before each actuation. Even when the handle of the known device is held by one hand and the actuating levers are actuated by the thumb of the same hand, the shifting of the thumb requires an effort which quickly results in fatique. Another disadvantage of that known design resides in that the force which is due to the above-mentioned friction of counterweight must be overcome. That force may be considerable if the volume to be dispensed is to be adjusted to a numerically determined value.

In the known device, intermediate positions are adjusted and maintained by means of a transverse slider, which extends through the handle and has a protruding stop, which is engaged with a stepped abutment. Before such adjustment, the abutment must be moved out of the path of the stop or the latter must be moved out of the path of the abutment. For this reason, the volume can be adjusted only in relatively large steps.

The publication cited above discloses also an embodiment in which only one actuating lever is provided. That embodiment has the disadvantage that the force of a strong spring must be overcome during the actuation of the device. That spring must be so dimensioned that it can reset the entire mechanism, inclusive of the piston of the syringe. This operation also results in fatique. Whereas no spring is provided in the other embodiment comprising two sliders because the forces are possibly somewhat smaller in spite of the forces which are due to the friction and the counterweight, this arrangement will involve the disadvantages described hereinbefore.

SUMMARY OF THE INVENTION

It is an object of the invention to provide a pipetting device which is of the kind described first hereinbefore and comprises two sliders, which are interconnected by a pinion, and so to improve such device that it can be actuated more conveniently and with smaller forces and the volume to be handled can be infinitely adjusted. This is not readily possible with the known design because it has been believed that it is essential to provide the stepped abutment for cooperation with the transverse slider, which is operable only in a complicated manner and which would extend through the handle of the device and would interfere with its actuation.

This object is accomplished according to the invention in that a single actuating lever is provided for moving the piston and an actuating mechanism is provided between the actuating lever and the sliders and is provided with a stop member, which consists of a transverse slider and is shiftable by positive engagement and is so arranged that in response to an automatic resetting of the actuating lever to its initial position the stop member is moved from the path of one slider into the path of the other slider.

The provision of two racks which are movable relative to each other in mutually opposite directions eliminates the need for overcoming the force of a strong return spring. Such an arrangement is simplified by the invention in a surprising manner in that, e.g., the thumb for actuating the device always bears on the same actuating knob for advancing and returning the piston. The forces are minimized because the automatically shiftable stop member is shifted in response to the resetting of the actuating lever. This results in the advantage that only small forces, particularly spring forces, are sufficient for resetting the actuating lever.

In this connection a desirable feature resides in that the resetting means comprise two weak tension springs for automatically resetting the actuating lever. But the actuating lever may also be returned by different means, such as solenoids fed from a battery.

The stop member constituted by a transverse slider may be interengageable with a movable cam, by which the stop member can be adjusted and which is biased by a biasing member, which is adapted to be stressed by at least one slider. When that cam is provided, the actuating lever will be subjected only to a negligible load and only during the first part of its movement.

In a desirable embodiment, the stop member consisting of a transverse slider is provided with an actuating wedge, which is engageable with the cam, and the transverse slider is adapted to engage opposite side faces of the cam in alternation and is thus laterally displaceable in alternating directions. In this manner the invention provides a simple shifting device so that both sliders can be actuated by a single actuating lever. Within the scope of the invention, the transverse slider can be locked in its ajusted position by a stop and may be automatically unlocked as the actuating lever returns to its initial position.

In a particularly preferred embodiment of the invention, the pipetting device comprises a locking carriage provided with abutments for springs for resetting said carriage. That locking carriage comprises two parts, which are movable relative to each other and consist of a carriage body and a detent carrier, and compression springs are interposed between said parts. The stop member consisting of a transverse slider is transversely slidat.y mounted on the detent carrier. Stops are provided in the housing and are engageable with abutments on the carriage body to define the end positicn of the locking carriage. The detent carrier is movable by the actuating lever. This embodiment is desireble particularly in connection with the fact that the member can be locked in position because the locking carriage consists of two parts so that a shifting is effected shortly before the end position is reached.

In a particularly desirable embodiment, the actuating mechanism is movable against the force exerted by the spring means which serve to reset only the actuating mechanism and the actuating lever. When the actuating mechanism is in its initial position, a stop member consisting of a transverse slider provided with end stops is adjustable to a position in which one end stop faces a stop face of a slider that is in a retracted position. This permits the use of weak resetting spring because only the actuating mechanism is to be moved whereas in the known design comprising a return spring the piston must also be retracted by the forces applied by the operator. In this manner the pipetting device according to the invention can be actuated even conveniently.

In combination with such an actuation by a single lever the invention provides means for an infinite adjustment of the volume which is to be sucked. Said adjusting means comprise an adjusting screw, which is known per se and has small tolerances and serves to adjust an abutment for controlling the volume, and a transmission, which is connected to the screw and provided on the other side with a digital indicator, from which the value which has been adjusted can be read. The indicator is visible through a window which is formed in the housing and indicates the position of the decimal point.

The combination of an infinite adjustment by an adjusting screw having close tolerances and an actuating mechanism comprising two sliders which are movable relative to each other in opposite directions constitutes a special feature, particularly in an arrangement comprising a single actuating lever, which can be used to move the piston against the force of relatively weak resetting springs. In that connection the preferred embodiment comprises a stroke-limiting frame, which is fixed in the housing and in which the abutment or stop and an actuating rod are guided. That actuating rod is connected to a piston rod of the syringe so that two abutments are provided and the means for limiting the stroke can easily be adjusted. According to another desirable feature the head of the piston rod is formed with a groove, which receives a projection provided in a recess for receiving the piston rod head. That recess is disposed in a guide block. A locking arrangement desirably comprises said guide block, to which the actuating rod carrying the stop is fixed, and which is provided with a pivoted locking member, which is pivotally movable outwardly through an opening provided in the housing at that end thereof which is near the syringe. The housing is provided at said opening with a U-shaped recess, which is provided with a double-said pressure contact spring and serves to receive a syringe body, which is removable independently of the piston of the syringe. That piston and the syringe body are replaceable when the stop is in its lower position.

Because the piston rod head is axially fixed, a satisfactory transmission of the movement for adjusting the volume is ensured, and in combination with the stroke-limiting frame such movement is easily transmitted. In this connection, a special advantage is afforded by the fact that the syringe body can be replaced independently of the syringe piston.

The infinite adjustment is effected by a rotary knob, to which the adjusting screw is non-rotatably and axially movably connected and which is associated with braking means. The braking means suitably comprise a brake shoe, which is mounted on a rotatable disc. Alternatively, the braking means may comprise a disc which is connected to the rotary knob and is larger in diameter than the knob and has detent recesses, and one or more spring-loaded detent teeth, which are associated with said detent recesses. The spacing of the detent recesses is suitable of an order corresponding to a volume of 1/100 milliliters.

In combination with the above-mentioned bipartite locking carriage the above-mentioned means for locking the stop suitably comprise two detent recesses, which are provided on the carriage body and are adapted to receive a detent tooth provided on the transverse slider, which is mounted on the detent carrier. The interengagement between the detent tooth and the detent recess can be eliminated in that the carriage body and the detent carrier are moved apart by compression springs disposed between said carriage body and detent carrier.

BRIEF DESCRIPTION OF THE DRAWINGS

An illustrative embodiment of the invention will now be described more in detail with reference to the drawings, in which

FIG. 4*b* should be joined to FIG. 4*a* on the right.

In all figures, like parts are designated with the same reference characters.

DESCRIPTION OF THE PREFERRED EMBODIMENTS

Figures 1A, 1B, 7:
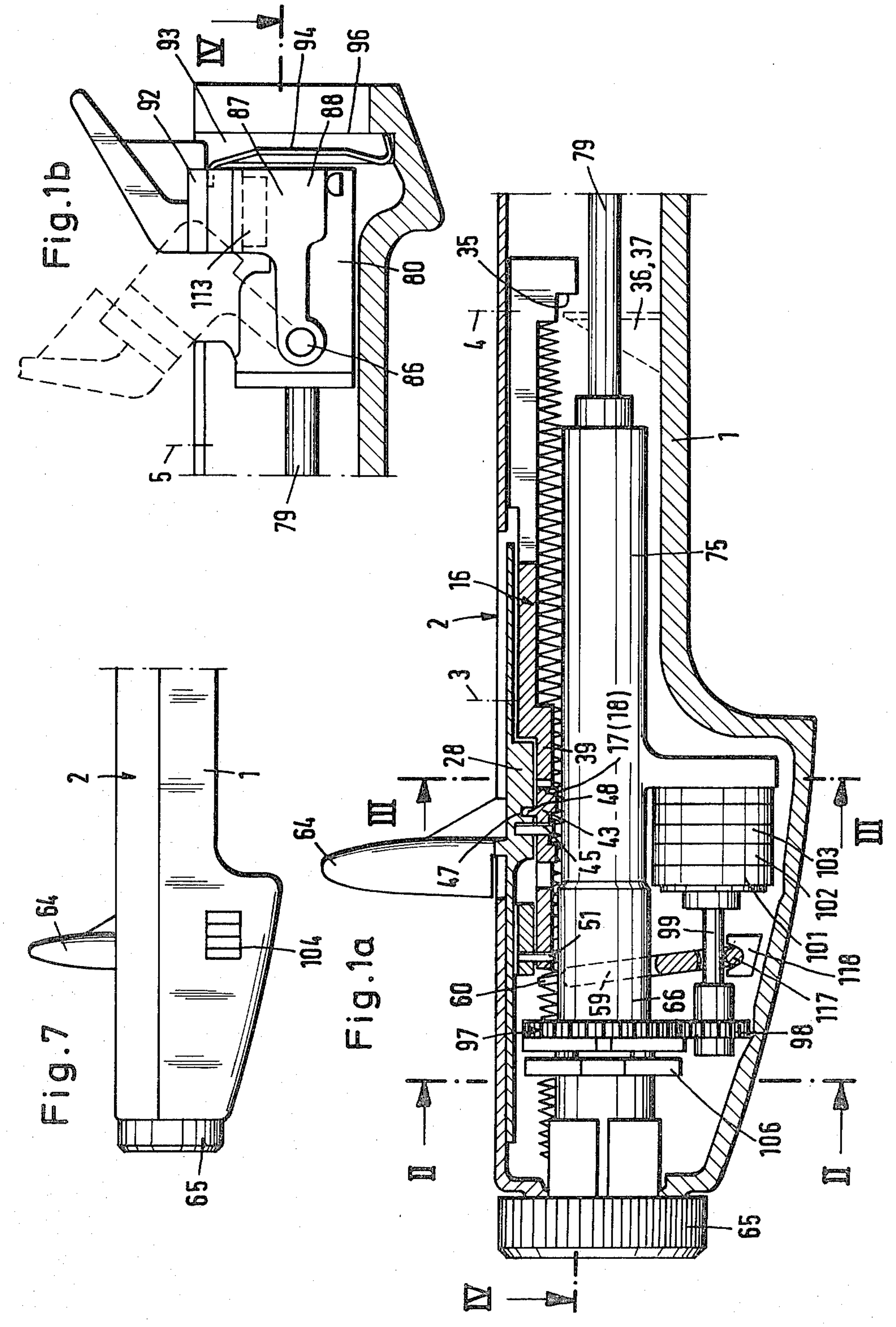
FIGS. 1*a* and 1*b* are a central longitudinal vertical sectional view showing the pipetting device. Both Figures can be joined at the section line to show the entire device.
FIG. 7 is a fragmentary side elevation showing a housing part for illustrating a certain portion viewed from the forward end in FIG. 1*a*.

The housing constitutes a handle of the device and is composed of a bottom part 1 and a top part 2. These parts of the housing may be screwed together or may be held together in the longitudinal direction in that they are fitted one in the other and locked by wedge fasteners, which are not shown in detail and provide a lateral guidance and are interengageable when the top and bottom parts of the housing are in proper registration. With reference to FIG. 1, fastening screws may be provided in the side walls, as is indicated by dash-dot lines 3, 4, 5.

As is apparent also from FIG. 4, tracks 8, 9 for sliders 10, 11 are provided on the inside of the outer longitudinal side walls 6, 7. Racks 12, 13 are formed on the inside surface of the sliders 10, 11 at the lower edge thereof. A pinion 14 is in mesh with said racks and is rotatably mounted on a pin 15, which is fixed in the bottom part 1 of the housing. That pinion ensures that the sliders 10, 11 will perform exactly equal and opposite movements.

Figure 6:
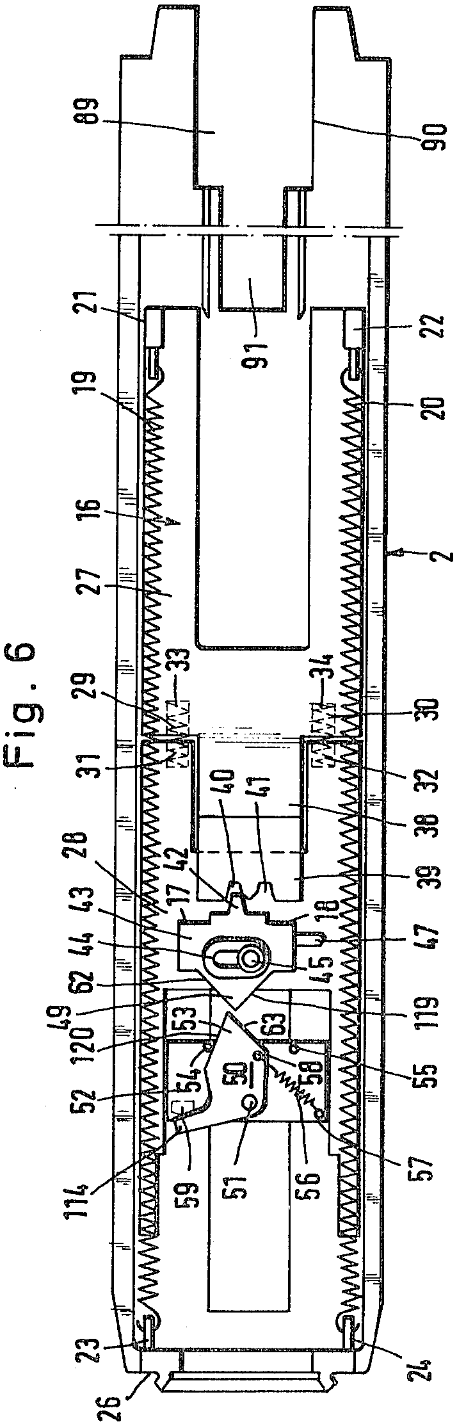
FIG. 6 is a bottom view of the upper part of the device.

The sliders 10, 11, which are guided in the bottom part 1 in the side walls 6, 7 cooperate with a detent carrier 28, which is provided in the top part 2. The sliders 10, 11 engage end stops 17, 18 in alternation because the shifting member consisting of a transverse slider 43 shown in FIG. 6 is contrained to be moved into the paths of the sliders 10, 11, specifically of the upper surfaces 122, 123 of said sliders, which surfaces serve as stop means, in alternation (FIG. 4*a*). The actuating lever 64 constitutes a handle and is connected to the detent carrier 28. Owing to this arrangement, the transverse slider 43 can be used to move the sliders 10, 11 in alternation against the action of relatively weak tension springs 19, 20, which at one end engage abutments 21, 22 of the locking carriage and which extend along the housings to abutments 23, 24 disposed close to that end face 26 of the housing which is remote from a syringe body 25. The end face 26 is formed on the top part 2, as is apparent from FIG. 6. The two springs 19, 20 constitute resetting springs.

The locking carriage 16 is bipartite and has a forklike carriage body 27 and a detent carrier 28, which is disposed on the same level and is guided in the same longitudinal track as the carriage body parallel to the longitudinal axis of the housing. Springs 33, 34 are disposed between the carriage body and the detent carrier and with their ends extend into recesses 29, 30 and 31, 32, respectively, and tend to urge the two parts 27 and 28 apart. The carriage body 27 is provided with depending abutments 35, one of which is shown in FIG. 1*a*. When one of these abutments has reached the stops 36, 37 in the side walls 6, 7, the springs 19, 20 can no longer move the carriage body to the left in FIG. 6 so that the compression springs 33, 34 will then act to disengage the detent carrier 28 from the carriage body 27.

The locking carriage is provided with a projection 38, which as shown in FIG. 1*a* has a portion 39 provided with a depending step and at its forward end has two detent recesses 40, 41.

The detent recesses face a detent tooth 42, which is provided on a transverse slider 43. The transverse slider 43 is formed with a slot 44, which extends transversely to the longitudinal direction of the housing and receives a pin 45, which is carried by the detent carrier 28. The latter is formed with a guiding groove 47 and the transverse slider is formed with a rib 48, which is guided in the groove 47. As the groove 47 and the rib 48 extend transversely to the longitudinal direction of the housing, the transverse slider 43 is freely movable in that direction relative to the pin 45. That movement is limited by the engagement of the pin 45 with the ends of the slot 44 in such a manner that the detent tooth 42 enters one of the detent recesses 40, 41 in each end position.

An actuating wedge 49 having equal sides 62 is centrally provided on the transverse slider 43. A movable cam 50 is associated with the actuating wedge 49 and is pivoted on a pivot pin 51, which is carried by a bridge 52, which is secured to the top part 2 of the housing. The movable cam 50 has a wedge-shaped tip 53, which is reciprocable between two stops 54, 55, which limit the excursion. The cam 50 is reciprocated between these stops by a tension spring 56 and a lever 59. The tension spring 56 is secured at one end at 57 to the bridge 52 and at the other end to the cam 50 at 58. The lever 59 is pivoted in the bottom part 1 (FIG. 1*a*) and is moved by the slider 10 when the latter, which on the other side is guided in the housing, is in its position in which it is as remote as possible from the syringe body 25, on the left in FIG. 4*a*. For this purpose the slider 10 has a projecting stop 115, which becomes effective when the springe piston 116 has been extended as far as possible into the syringe body 25.

For this reason the lever arm 59 is part of a U-shaped lever, the crosspiece 117 of which is pivoted in bearing openings 118 of the bottom part 1 of the housing (FIG. 1*a*). The lever 59 engages an arm 114, which is carried by the cam 50 on that side thereof which is opposite to that acted upon by the spring 56. The lever 59 constitutes one leg of the U-shaped lever and at its free end carries a finger 60. Another finger 61 (FIG. 4*a*) is carried by the other leg of the U-shaped lever and is engageable by the stop 115 of the slider 10. These means constitute a simple arrangement for transmitting motion from the two sliders 10, 11, which are actuated in mutually opposite directions.

By means of the U-shaped lever comprising the elements 60, 61, 117 it is ensured that when the associated slider 10 is moved to the left in FIGS. 1 and 6 the cam 50 will be moved to the position shown in FIG. 6 and the spring 56 will be stressed. When in this initial position the side face 62 of the transverse slider 43 engages the side face 63 of the cam 50 after the compression springs 33, 34 have expanded to disengage the detent carrier 28 from the carriage body 27, the transverse slider 43 is moved laterally to its other position, in which the detent tooth 42 is aligned with the detent recess 41. When the slider 10 is reset toward the syringe body 25 so that the lever 59 constituting a stressing element and the arm 114 carried by the cam 50 are released and the spring 56 can now rotate the cam 50 into engagement with the stop pin 55, then the transverse slider can be returned to the position shown in FIG. 6. Upon the resetting of the locking carriage generally designated 16, the side face 119 of the transverse slider 43 engages the side face 120 of the cam 50 so that the operation will then be repeated in the opposite direction.

From the above description of the operation it is apparent that only a light-weight mechanism is actuated by the springs 19, 20. It is also apparent from FIG. 1 that the detent carrier 28 carries an actuating lever 64, by which the entire locking carriage 16 can be moved. During the movement to the right in FIGS. 1 and 6, the two parts of the locking carriage are held together by the pressure contact and when the locking carriage has been released its two parts 27, 28 are held together by the tension springs 19, 20 until the carriage body 27 has been arrested by the stops 36, 37 and the detent carrier 28 is disengaged from the carriage body by the springs 29, 30 so that the operation can be reversed.

As is apparent from FIG. 4*a*, rotary knob 65 extends into the end of the bottom part 1 of the housing having the side walls 6 and 7. That knob 65 has a cylindrical guiding portion 66, which extends into the interior of the housing and is rotatably mounted in the bearing 67 but cannot be axially removed from it. That cylindrical guiding portion 66 is formed with two axial longitudinal grooves 68, 69, which receive the ends 70, 71 of a diametral crosspiece, which is carried by a screw 72. The latter extends out of the guiding portion 66 and into a bore 74 in a stroke-limiting frame 75, which is fixed in the bottom part of the housing. The bore 74 is formed with female screw threads 73 in mesh with the screw 71. Owing to this arrangement, a rotation of the rotary knob 65 can advance or retract the abutment 76 constituted by the inner end of the screw 72 along the axial line 77 into and out of the housing so that the movement of a stop 78 carried by an actuating rod 79 connected to the piston rod 121 of the syringe will be limited. The stop 78 constitutes the head of the actuating rod 79 and together with the crosspiece 124 of the stroke-limiting frame 75 constitutes another or second stop. The position in which the stop 78 engages the abutment 76 will depend on the position to which the screw 72 has been adjusted in the stroke-limiting frame 75. At its end facing the syringe, the stroke-limiting frame 75 has an opening 125, through which the actuating rod 79 extends.

Figure 4B:
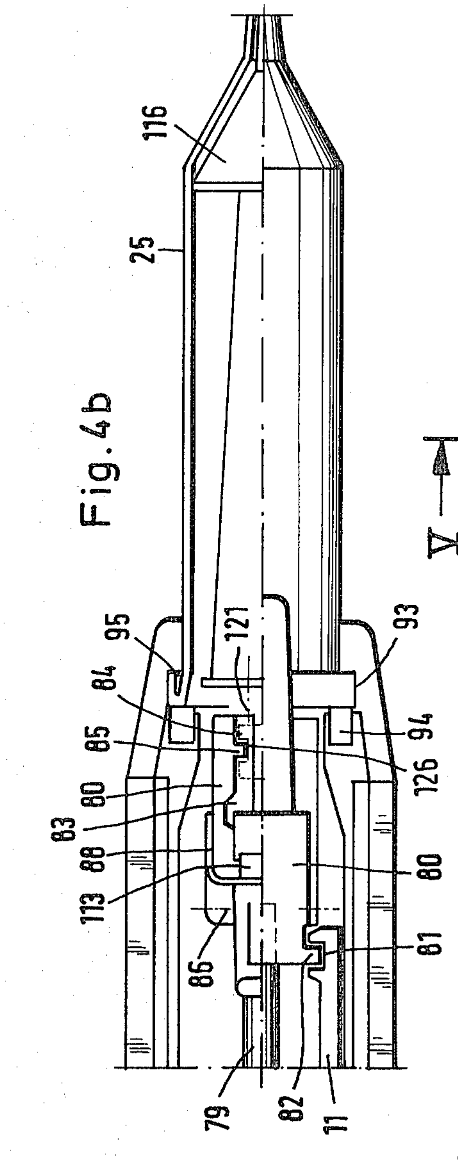
FIGS. 4*a* and 4*b* are a sectional view taken on line IV—IV in FIG. 1 from above on the lower part of the device from which the upper part has been removed.
Figure 4A:
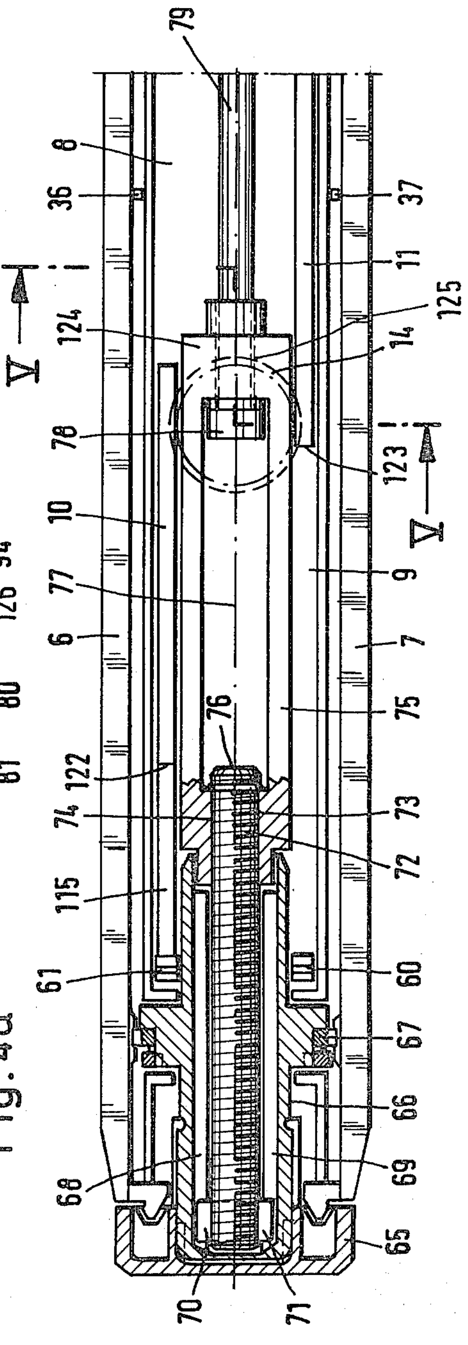

As is apparent from FIG. 4*b*, the actuating rod 79 is mounted on a guide block 80, which axially movable in the housing and has an extension 82, which extends into a groove 81, which is formed in the slider 11 and faces the interior of the housing. As a result, the guide block 80 will always be reciprocated with the slider 11 so that a piston 116 which is movable in the syringe body 25 will be reciprocated relative to the latter. The locking means connecting the piston 116 to the guide block 80 will be described hereinafter.

The guide block 80 has a recess 83 for receiving a piston rod head 84, which is shown in dotted lines in FIG. 4*b*. The recess is U-shaped and open-topped and receives a projection 85, which extends into an associated recess or groove formed in the piston rod head. The piston rod head 84 can be upwardly removed because the recess 83 is U-shaped.

Figures 2, 3, 5, 8:
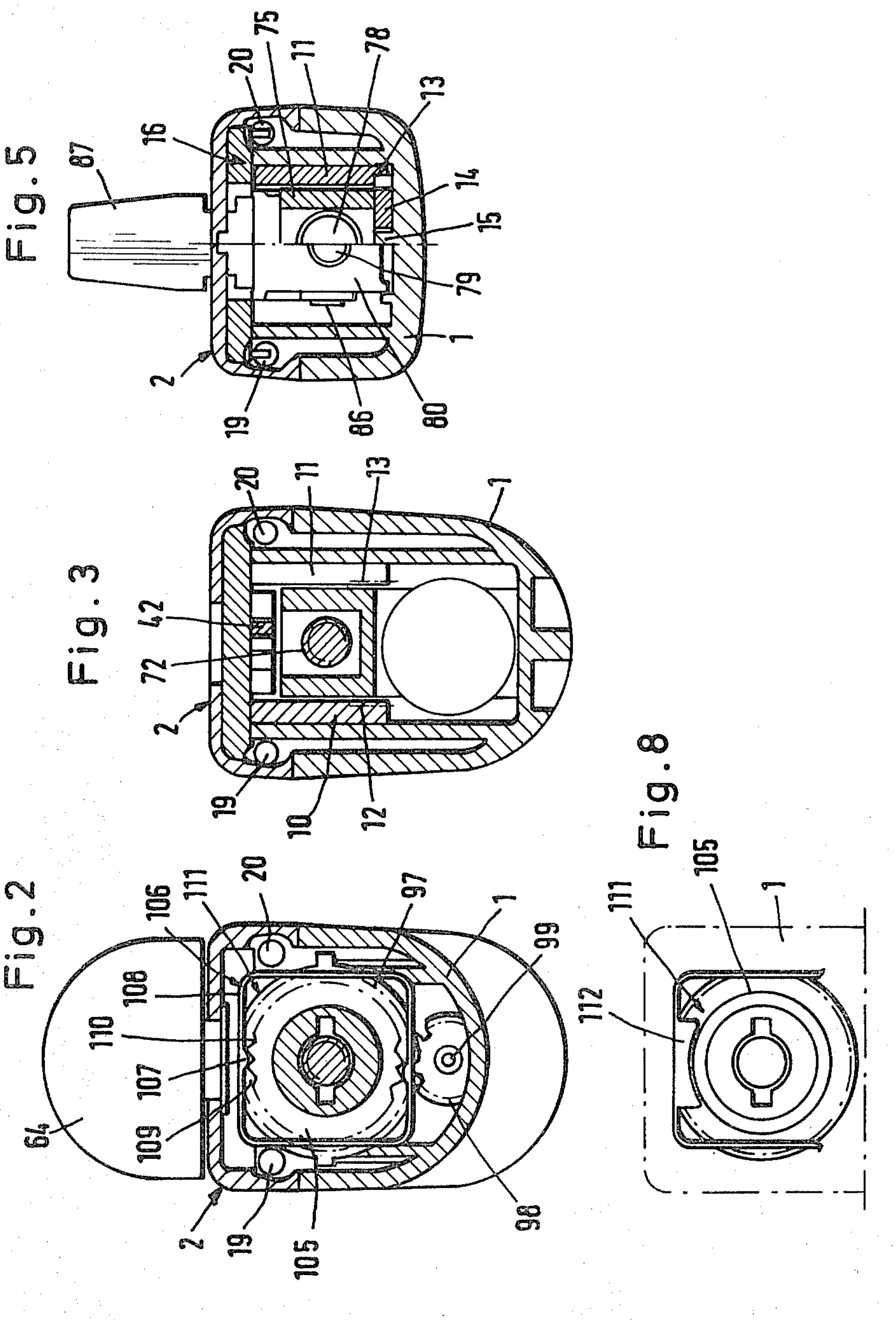
FIG. 2 is a sectional view taken on line II—II of FIG. 1.
FIG. 3 is a sectional view taken on line III—III in FIG. 1.
FIG. 5 is a sectional view taken on line V—V in FIG. 4*a*.
FIG. 8 is a diagrammatic view which is similar to FIG. 2 and illustrates a different brake.

The guide block 80 is provided with a transversely extending, two-part axle 86 for mounting a pivoted locking member 87, which is shown also in FIG. 1*b* and has a handle shown also in FIG. 5. That pivoted locking member 87 has side walls 88, which embrace the guide block 80 from the outside, and between the side walls has a depending extension 113, by which pressure is applied to the head 84 of the piston rod to hold said head in position. The head 84 of the piston rod is wider than the piston rod of the syringe piston. The side walls of the pivoted locking member 87 are elastically held on the guide block 80 and are releasably locked by suitably profiled surface portions. The top part 2 has an open-topped opening 89 for the pivoted locking member. The opening 89 has an enlarged end portion 90, through which the pivoted locking member can be swung out. The portion 89 is adjoined by a narrower, slotlike portion 91, which is adapted to receive a narrow neck portion 92 of the pivoted locking member so that the pivoted locking member 87 can perform a resetting movement in unison with the piston rod whereas the pivoted locking member 87 cannot be swung out to the position shown in dotted lines in FIG. 1*b* when the narrower portion 92 of the member 87 has entered the narrower portion 91 of the opening 89.

Owing to this arrangement the pivoted locking member 87 cannot be moved to its open position unless the syringe piston has been extended as far as possible into the syringe body 25. In that position the syringe piston can be inserted or interchanged. When the syringe piston is in a retracted position, in which the pivoted locking member cannot be opened, the head 84 of the piston rod remains locked but the syringe body 25 can be swung upwardly out of a U-shaped recess 93 whereas the piston remains connected to the housing 1, 2. This is important when only the syringe body 25 is to be exchanged.

The recess 93 is formed by a U-shaped groove in the bottom part 1 of the housing and is open to the parting line between the housing parts 1, 2 and adapted to receive the flange 95 of the syringe body. On that wall of the recess or groove 93 which is nearer to the rotary knob, a contact pressure spring 94 is provided, which has forwardly directed legs extending at least over the side faces of the groove 93. When the flange 95 of the syringe body 25 has been inserted into the recess 93, the spring 94 ensures that the flange 95 will always be held against the wall 96 of the recess 93 in a defined position.

A transmitting member consisting particularly of a gear 97 is connected to the rotary knob 65, particularly to its cylindrical guide portion 66. The gear 97 is in mesh with a gear 98, which is secured to a shaft 99, which is rotatably mounted in the bottom part 1 of the housing. The shaft 99 carries also digital indicator which may consist of a counter which comprises a plurality of digit wheels 101, 102, 103, which are adjustable in accordance with the decimal system. Adjacent to that digital indicator, a window 104 shown in FIG. 7 is formed in the bottom part 1 of the housing and has such a height that only one digit of each digit wheel is visible so that the window 104 constitutes a reading window. A portion of a side elevation showing the bottom part of the housing is apparent from FIG. 7. During the infinite adjustment of the volumetric capacity of the syringe, the instantaneous value is apparent in the window.

In order to permit a reliable adjustment of the device and to ensure that the device will be held in its adjusted position, an element of a brake 111 is provided on the cylindrical guide portion 66, as is shown in FIGS. 2 and 1*a*. That element element consists of a disc 105, which is non-rotatably connected to the cylindrical guide portion 66. A U-shaped braking member 106 is associated with the rotating disc 105 and is secured in the bottom part 1 of the housing. The U-shaped braking member 106 has an elastically deflectable crosspiece 108, which carries a slightly inwardly protruding detent tooth 107. The disc 105 is formed with detent recesses 109, 110, which are associated with the detent tooth 107, as is apparent from FIG. 2. The lead of the screw and the ratio of the diameters of the screw and the disc are so selected that the pitch of the detent recesses corresponds to a syringe volume of an order of 1/100 ml so that a virtually infinite adjustment can be effected by means of the screw.

In the detail shown in FIG. 8 it is apparent that the disc 105 is circular and the resilient crosspiece 108 carries a concave brake shoe 112, which conforms to the periphery of the disc 105. That arrangement permits of an actually infinite adjustment. In that case the last digit wheel of the digital indicator 100 is provided at each digit with a series of graduations so that fractions can be read with reference to a pointer which is constituted by a marked edge of the window.

What is claimed is:

1. In a pipetting device for detachably holding and for actuating a syringe comprising a syringe body, a piston, which is reciprocably mounted in said syringe body, and a piston rod connected to said piston, in combination:

a housing provided with retaining means for detachably holding said syringe body so that said piston rod extends in a longitudinal direction of said housing, first and second sliders, which are mounted in said housing and extend in and are movable in said longitudinal direction and are transversely spaced apart, connecting means carried by one of said sliders and detachably connectable to said piston rod, first and second racks carried by said first and second sliders, respectively, a pinion, which is rotatably mounted in said housing and on diametrically opposite sides of said pinion is in mesh with said first and second racks, respectively, a detent carrier mounted in said housing and movable in said longitudinal direction, an actuating lever connected to said detent carrier and extending out of said housing, a transverse track provided on said detent carrier and extending transversely to said longitudinal direction, a transverse slider mounted on said transverse track and movable along the same and carrying end stops, which are spaced apart transversely to said longitudinal direction, two slider stops carried by said first and second sliders, respectively, and adapted to cooperate with said end stops in alternation in dependence on the position of said transverse slider, shifting means movably mounted on said detent carrier and arranged to be shifted in response to a reciprocation of said first and second sliders, and resetting means comprising spring means for automatically resetting said detent carrier and said actuating lever to an initial position, the arrangement being such that the transverse slider extending into the path of one of said first and second sliders is moved into the path of the other of said sliders in response to the resetting of said actuating lever to said initial position.

2. A pipetting device as set forth in claim 1, wherein said transverse slider comprises a projecting stop, said shifting means comprise a cam, which is pivoted to said detent carrier and comprises a projection for engaging opposite sides of said projecting stop in alternation, a tension spring is connected to said cam and urges it toward a predetermined end position, and a stressing member is movably mounted in said housing and arranged to be actuated by one of said first and second sliders so as to move said cam away from said initial position to another end position, said cam having mutually opposite side faces, which are engageable with said transverse slider in alternation and arranged to reciprocate said transverse slider transversely to said longitudinal direction as said cam reciprocates between its said end positions.

3. A pipetting device as set forth in claim 2, wherein said stressing member consists of a U-shaped lever having two legs and a crosspiece connecting said legs, said crosspiece is rotatably mounted in said housing, one of said first and second sliders carries a stop, one of said legs is movable into the path of said stop carried by said one slider, said cam carries a protruding finger, and the other leg of said U-shaped lever is engageable with said protruding finger.

4. A pipetting device as set forth in claim 1, wherein locking means are provided for locking said transverse slider in position relative to a portion of said detect carrier and means are provided for automatically unlocking said transverse slider when said actuating lever reaches its initial position.

5. A pipetting device according to claim 4, wherein said resetting means comprise two resetting springs, a locking carriage is provided, which comprises said detent carrier and a carriage body and carries abutments for said two resetting springs, said carriage body and said detent carrier are movable relative to each other in said longitudinal direction, compression springs are disposed between said carriage body and said detent carrier, said housing is provided with stops for limiting the movement of said locking carriage, and said carriage body carries abutments for cooperating with said stops carried by said housing.

6. A pipetting device as set forth in claim 5, wherein said carriage body is formed with two detent recesses, said detent carrier carries a detent tooth for engaging said detent recesses in alternation, said carriage body and said detent carrier are movable apart to disengage said detent tooth from said detent recesses, and said compression springs disposed between said carriage body and said detent carrier tend to move said carriage body and detent carrier apart.

7. A pipetting device according to claim 1, wherein said actuating lever is operable to move said carriage in one direction along said housing, said resetting means are adapted to move said carriage in the opposite direction along said housing, each of said first and second sliders is movable in alternation to the other to a retracted position ahd has a stop face, and said transverse slider is movable so that said end stops face said stop face of one of said first and second sliders when the same is in said retracted position and said actuating lever is in its initial position and said spring is relaxed.

8. A pipetting device as set forth in claim 1, wherein said housing carries an abutment for limiting the return movement of said piston rod, an adjusting screw is rotatably mounted in the housing and extends in the longitudinal direction of said housing and carries said abutment, a tapped bore is provided in said housing and non-rotatable relative thereto and in mesh with said adjusting screw, a knob is rotatably mounted in said housing and is non-rotatably connected to said adjusting screw and axially movable relative to said adjusting screw, whereby a rotation of said rotary knob will result in an axial displacement of said adjusting screw and said abutment, and braking means are associated with said rotary knob.

9. A pipetting device as set forth in claim 8, wherein a cylindrical guiding element is provided, which extends into said housing and is rotatably mounted t'.erein, said rotary knob is non-rotatably connected to said cylindrical guiding element, said cylindrical guiding element is formed with two grooves, which extend in said longitudinal direction, said adjusting screw carries diametrically opposite projections extending into said grooves, and said braking means comprise a disc, which is non-rotatably connected to said rotary knob, and a brake shoe, which is carried by said housing and cooperates with said disc.

10. A pipetting device as set forth in claim 8, wherein said braking means comprise a disc, which is connected to said rotary knob and formed with detent recesses, and a U-shaped braking member, which is fixed in said housing and has a resiliently deflectable crosspiece carrying a detent tooth for yieldably interengaging with said detent recesses.

11. A pipetting device according to claim 8, wherein said housing contains a transmission, which is operatively connected to said screw and a digital counter is operatively connected to said transmission.

12. A pipetting device as set forth in claim 11, wherein said housing has a window and said digital counter comprises digit wheels, which are partly exposed to the outside through said window.

13. A pipetting device as set forth in claim 8, wherein a stroke-limiting frame is contained in and secured to said housing and has an end portion formed with said bore, said adjusting screw has an end portion which is disposed in said stroke-limiting frame, said abutment is carried by said end portion of said adjusting screw, said stroke-limiting frame has at its opposite end an opening, an actuating rod extends through said opening and is arranged to be axially aligned with said piston rod when said syringe body is thus held on said housing, and said connecting means are adapted to interlock said piston rod with said actuating rod.

14. A pipetting device as set forth in claim 13, for use with a syringe which comprises a piston rod head carried by said piston rod, wherein said connecting means comprise a guide block, which is carried by said actuating rod, a pivoted locking member is provided, which is pivoted to said guide block and adapted to maintain said locking means in locking position, said housing has an end portion which is adapted to receive said syringe body and which has an opening, said pivoted locking member extends out of said housing through said opening, said opening has a wider portion and a narrower portion, said pivoted locking member is adapted to be swung out of said housing so as to render said connecting means inoperative only when said pivoted locking member registers with said wider portion.

15. A pipetting device as set forth in claim 14, for use with a syringe having a syringe body which carries a flange, wherein said one end portion of said housing has a U-shaped recess for receiving said syringe body with said flange, said recess contains a double-sided contact pressure spring for holding said syringe body in position, said pivoted locking member carries a projection for covering the open side of said U-shaped recess, and said pivoted locking member is movable in said narrower portion of said opening from said U-shaped recess in unison with said piston rod.

16. A pipetting device as set forth in claim 15, wherein said U-shaped recess for receiving said syringe body is adapted to be exposed while said piston rod is connected to said connecting means, and wherein said syringe body when connected to said housing is adapted to be removed from said housing while said piston rod is connected to said one of said first and second sliders.

17. A pipetting device as set forth in claim 14, for use with a syringe in which said head has a groove, wherein said guide block is formed with a recess for receiving said head and said connecting means comprise a projection which is disposed in said recess and adapted to interengage with said groove.

* * * * *